April 27, 1948.   R. H. RUSHMER ET AL   2,440,300
RESIN BONDED ABRASIVE ARTICLE
Filed June 11, 1945
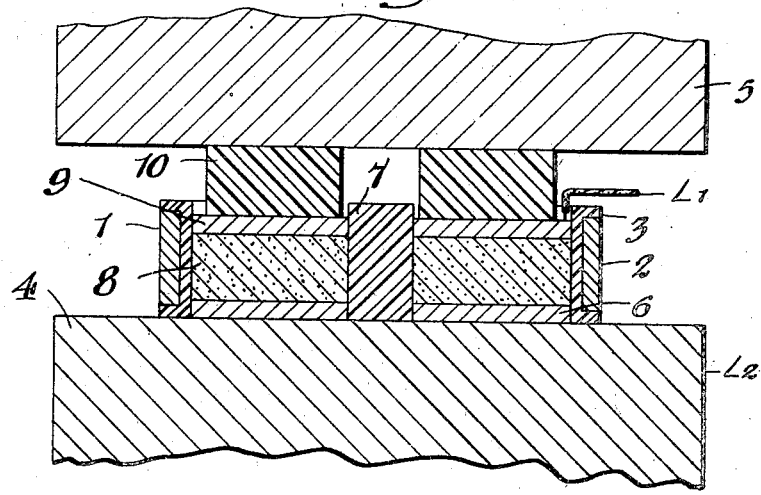
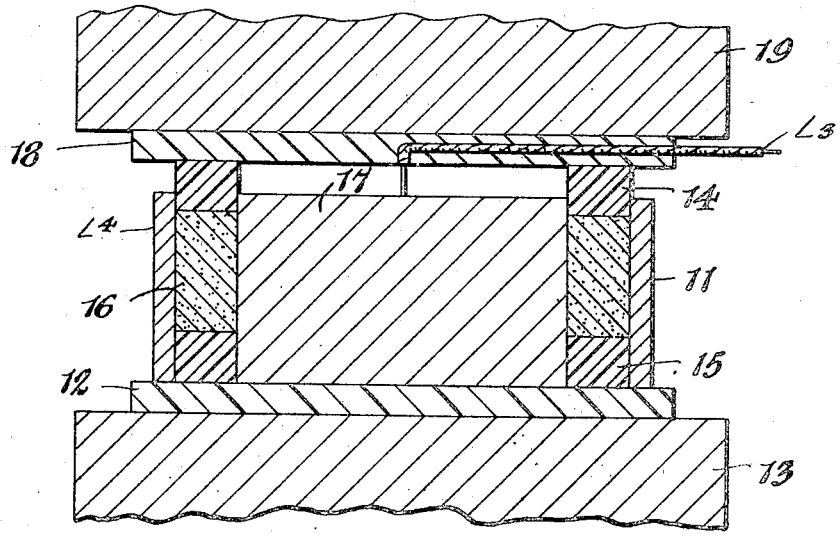
INVENTORS
RALPH H. RUSHMER
GEORGE J. GOEPFERT
BY
Attorney Patented Apr. 27, 1948

2,440,300

UNITED STATES PATENT OFFICE 2,440,300

RESIN BONDED ABRASIVE ARTICLE

Ralph H. Rushmer and George J. Goepfert, Niagara Falls, N. Y., assignors to The Carborundum Company, Niagara Falls, N. Y., a corporation of Delaware Application June 11, 1945, Serial No. 598,838

4 Claims. (Cl. 51—298)

This invention relates to improved abrasive articles and to methods for manufacturing the same. It is particularly concerned with dense resin bonded abrasive articles and methods wherein the abrasive mix is made electrically conductive and is heated by passage of the current through the mix while the mix is kept under pressure.

The most common method of making abrasive articles with a resin bond is that described in the patent to Martin Re. 19,318 or a modification thereof. According to that process abrasive grains are first wet up with a resin solvent such as furfural and then the wetted grains are admixed with a pulverized resin, the proportions of abrasive grains, resin solvent, and powdered resin being such as to provide a mix which is dry to the touch but which is cold moldable because of the action of the resin solvent on the powdered resin. After such a mix has been prepared it is commonly put into a mold and pressed at pressures of the order of 2000 pounds per square inch, more or less, to form a shaped article which can be removed from the mold and handled. The article thus removed is then placed in a suitable oven and given a heat treatment to first fuse the resin and then advance it to the infusible insoluble condition where it is very strong and consequently holds the abrasive grains firmly in place.

A number of patents have issued which are directed to improvements over the Martin patent in the nature of the resin solvent that is used. These improvement patents follow the general practice of the Martin patent and differ therefrom principally in the composition of the resin solvent.

These cold press processes have been used to a very great extent in making resin bond abrasives, particularly with the phenol-formaldehyde type of resin. The processes are relatively inexpensive and make it possible to provide abrasive articles having a wide range of properties by varying the size of the abrasive particles and the proportions of bond to abrasive grain. It is also possible to obtain some variation in the properties of the articles by varying the pressure used to form the article in the mold. However, there are limits to the density and hardness of the abrasive articles which can be thus formed. If the mixture contains more than a certain proportion of bond, which varies with the size of the abrasive particles and the pressure used in forming the article, the articles bloat because the gases which are formed during the heat treatment which is used to cure the resin cannot escape. Furthermore, the more resin there is introduced into the mix, the greater is the proportion of resin solvent which must be used in order to have the powdered resin attached to the abrasive particles and to get a uniform distribution of the bond through the mix. When too much bond, and correspondingly, too much solvent is used, the bond flows when the article is heated and the resulting product is not uniform because the bond concentrates in the bottom of the article.

In order to make articles of higher density, the mixes are sometimes subjected to the simultaneous action of heat and pressure by employing presses the platens of which can be heated. When this process is used, heat is transmitted from heating platens mounted on the platens of the press to the abrasive mix and the warmed resin becomes fluid, allowing the mix to be more closely compressed.

The processes of the prior art which have been described are commonly carried out in hydraulic presses, which are not well suited for uniform hot pressing. The hot press process is open to a number of objections, the principal one being the difficulty in transferring heat from heated platens through an abrasive mix, which is a very poor heat conductor. For this reason it is necessary to leave the mixes in the hot press for rather prolonged periods in order to get the heat conducted into the inside of the mix. Furthermore, when such mixes are hot pressed the resin on the outer sides of the wheel becomes cured prematurely, thus sealing up the surfaces and preventing the escape of the gases which are formed during the heat treatment of the mix. It is therefore commercially difficult to make dense wheels by such a hot pressing process.

It is also very difficult to make articles by the conventional hot pressing process which are uniform in density and have the same structure throughout.

In the making of such articles it is customary to weigh out the amount of mix to be used in making the article and then pressing to a thickness which will give the desired density by providing stops which prevent additional closing of the platens of the press to the desired thickness. Unless the platens of the press are preferably flat and parallel and unless the two plungers of the mold are also perfectly flat and parallel and uniform in thickness the mix is not heated uniformly over the entire surface. For example, if one of the plungers is slightly dished, more pressure will be applied to that part of the mix which is under the bottom of the dish because some of the pressure of the press is required to flatten out the plungers and the pressure on that part of the mix which is under the rim is correspondingly reduced. As a consequence of this condition there is a better transfer of heat at the part which is under the highest pressure and the bond there becomes heated higher than it is elsewhere. This results in a different structural condition within the article because the structure is determined, among other things, by the amount which the resin bond flows during the pressing operation which, in turn, is a function of the temperature, pressure and degree of cure of the resin.

If there are any irregularities in the plungers or in the platens there is a poor contact at low places and the mix at such places is not heated as much as it is elsewhere. This results in spots through the wheel which are of different structure than the mass of the wheel.

There is the further problem in conventional hot pressing processes of getting an article which is of the same density and structure throughout its thickness because of the fact that the heat has to be transferred from the outer surface toward the middle. If a low pressure is used in the initial stages to get the mix heated and after the mix is heated a higher pressure is used to compress the mix to the desired density, the resin at and near the surfaces of the article becomes advanced to an infusible condition while the pressure is low and when the final pressure is applied the mix in the inside, which has not been cured, compresses to a density which is higher than that on the surface. On the other hand if a high pressure is used throughout the hot pressing operation the article is more dense at and near the surfaces because the resin at those places softens before the inside of the mix is heated and made plastic enough to flow. Consequently the surfaces are, in effect, pressed at a higher pressure than the inside and the article is again not of uniform density throughout.

While theoretically it is possible to use a low pressure at the beginning of the operation and then apply the high pressure at just the right time to obtain a uniform density, as a practical matter it is impossible to do this because of the large variety of mixes and size and shapes of articles which are made. Consequently the conventional hot pressing practice almost invariably results in articles which are not uniform in density throughout their thickness.

It is accordingly an object of the present invention to provide a method of making dense resin bonded abrasive articles. Another object of the invention is to provide a commercially practical method of subjecting abrasive mixes to the simultaneous action of heat and pressure. Still another object of the invention is the provision of dense resin bonded abrasive articles which are substantially uniform throughout and free from the effects of bloating. Additional objects of the invention will be apparent from a consideration of the description herein made.

We have discovered that resin bond abrasive mixes can be made electrically conducting by introducing into the mix small quantities of special grades of finely divided carbon and that such mixes can be heated by passing electric current through them while subjecting them to pressure. We have further discovered that articles made according to such a process are uniform and can be made of higher density than articles made according to the processes of the prior art without getting the bloating and ununiform distribution of the bond obtained by such processes. Our improved method is also rapid and economical and is therefore commercially practical.

We have found that the kind of carbon used to impart electrical conductivity to the mix is very important. Although chemically pure carbon is an electrical conductor, most forms of carbon which are available commercially are not satisfactory for use in our invention. It is important that the carbon particles be of very small size and that eliminates such materials as powdered charcoal or other carbonaceous material where the carbon is formed in large pieces and reduced to fine particles by grinding. Carbon black and lampblack, which are very finely divided materials, are unsatisfactory, possibly because of the presence of undecomposed oily materials which reduce the electrical conductivity.

The material which we have found to be most satisfactory is known as "acetylene black" which is formed by the decomposition of acetylene. One form of acetylene black which we have used successfully is that sold by the Shawinigan Products Corporation of New York city as "Shawinigan Black." Another type of conducting carbon black which we have found suitable is that sold under the trade-mark "Conductex" as supplied by Binney and Smith Company of New York city, New York.

In carrying out our process we prepare a mixture containing the electrically conducting material, place it in a suitable mold, and while subjecting it to pressure, apply an electrical potential across the article in such a manner as to cause a current to flow through the mixture, thus heating it and causing the resin to soften and flow, whereby the mixture is highly compressed and a dense article is obtained. Since the heat is generated within the mixture, the difficulties which result from the hot pressing practices of the prior art are avoided.

Depending upon the relative proportions of the abrasive wheel being produced, we may employ either of the two types of equipment. Where the ratio of the outside to the inside diameter of the wheel is less than about 3, it is feasible to apply the potential from the mold barrel to the arbor pin, which is used to form the hole in the wheel. However, where the ratio of the outside to the inside diameter is much greater than about 3, it is desirable to pass the current from one of the flat faces to the other flat face rather than between the mold barrel and the arbor pin because the current density is substantially uniform across the whole section of the wheel where this process is used, whereas by the other process, the current density is naturally and necessarily higher at the arbor hole than it is at the periphery. The latter method may, of course, be used regardless of the ratio of outside to inside diameter.

Understanding of our invention will be facilitated by referring to the drawings, wherein:

Figure 1 is a cross-section, partly diagrammatic, of apparatus employed in carrying out one modification of the invention; and Figure 2 is a similar drawing of apparatus used in carrying out the second modification of the process of our invention.

Figure 1 illustrates the method wherein the current is conducted between the two flat surfaces of the abrasive wheel. In the drawing, a mold 1 consisting of a steel band 2, provided with electrically insulating top, bottom and inner portions 3 rests on the lower platen 4 of a press having an upper platen 5. Also resting on the lower platen 4 is a bottom plunger 6 and an electrically non-conducting arbor pin 7. The abrasive mix 8 is compressed between the bottom platen 6 and a top platen 9 by the action of the compression ring 10, which is also an electrically non-conducting material. The two plungers 6 and 9 are electrically conducting materials such as steel. Top plunger 9 is provided with an electrical connection indicated as L1 and a source of electrical potential is connected across L1 and a lead L2 which is connected to the bottom platen of the press.

Figure 2 illustrates the method and apparatus for carrying out the invention by passing the current from the mold barrel to the arbor pin. In that drawing the steel mold barrel 11 rests on insulating bottom plate 12 which, in turn, rests on the lower platen 13 of the press. The apparatus also comprises top and bottom insulating plungers 14 and 15, respectively, and the abrasive mix 16. The apparatus also comprises the electrically conducting arbor pin 17 which is provided with a lead L3 carried out through a recess in the upper insulating plate 18 through which the pressure is applied between the top platen of the press 19 and the top plunger 14. The mold barrel 11 is also provided with lead L4 and the source of electrical potential is connected between the two leads L3 and L4.

In carrying out our invention there are a number of variations which have to be taken into consideration in order to obtain the most satisfactory results. The electrical characteristics of the mix vary with the grit size and composition, including both the relative amount of conductive carbon and resin bond and the comparative "wetness" of the mix. In making the resin abrasive mixes, if the amount of resin solvent is slightly on the low side there may be a small proportion of the resin powder which is not wholly picked up by the abrasive grains, while if the proportion is slightly high the mix is slightly wet because there is not sufficient powder to completely cover up the resin solvent and the solution of resin which is formed when the powder is mixed with the wetted grains. The conductivity of the mix is greater when the mix is on the wet side. It also increases, as would be expected, with increase in the amount of the conductive carbon. More important than this is the adjustment of the mix to such condition that under the conditions in which it is pressed the resistance does not decrease as the mix is heated. If the composition of the mix and the conditions under which it is treated are such that the resistance decreases, the current flowing through the mix increases and frequently causes arcing. If this occurs, the resin is overheated and the article is spoiled and frequently the mold is partially damaged. It is therefore essential in carrying out our process to provide a mix which, under the conditions under which it is molded, has either a constant resistance or a resistance which increases as the article becomes heated. We much prefer the latter condition since this provides an automatic control for the process. With such conditions, when the voltage is first applied a current goes through the mix which heats it up and as the mix becomes heated to the desired degree the resistance increases to an extent that the current becomes very low. Such mixes cannot overheat nor can there be arcing with the attendant undesirable results.

We will now describe our invention by reference to specific examples, it being understood that the examples are for illustrative purposes only and are not limitative.

*Example I*

81 parts of a mixture of equal proportions of 14 grit and 16 grit fused alumina were wet up with 3 parts of a liquid phenol-formaldehyde condensation product sold by the Bakelite Corporation under the designation "BR-7534." 7 parts of powdered "A" stage phenol-formaldehyde resin sold by the Bakelite Corporation under the designation "BR-2417" were mixed with 9 parts of powdered cryolite and the mixture was added to the wetted abrasive grains. After thoroughly mixing, 1½ parts of acetylene black were added and distributed over the resin coated abrasive grains.

The mixture was put into a mold of the type illustrated in Figure 1. The inside diameter of the electrically non-conductive mold was 3⅛ inches, and the arbor pin ¼ inch in diameter. The mixture was compressed under a pressure of 2000 pounds per square inch to a thickness of $\frac{7}{8}$ inch while 120 volts were applied across the terminals L1 and L2. The current was found to be 5.5 amperes when the voltage was first applied. It gradually dropped to 2½ amperes at the end of 8 minutes, at which time the voltage was removed, the pressure released, and the article taken from the mold.

The article was thereupon given an oven treatment to cure the resin according to the following schedule:

| | °F. | | °F. |
|---|---|---|---|
| 16 hrs | 170 | 1 hr | 275 |
| 1 hr | 195 | 1 hr | 300 |
| 1 hr | 215 | 1 hr | 325 |
| 1 hr | 225 | 6 hrs | 350 |
| 1 hr | 250 | | |

The cured article had a density of 2.93 grams per cubic centimeter and was found to be an excellent grinding wheel.

*Example II*

64 parts 100 grit fused alumina abrasive grain was mixed with 2.8 parts of a liquid resin described in Example I. 17 parts of the powdered resin of Example I were mixed with 16.2 parts of powdered cryolite and the mixture was added to the wetted abrasive grains. After thoroughly mixing, 3 parts of acetylene black were added and distributed over the resin coated abrasive grains.

The mixture thus prepared was put into a mold of the type illustrated in Figure 2 and having an inside diameter of 8¼ inches and an arbor of 3¼ inches. After assembling in a manner indicated in Figure 2, the mix was pressed at 2000 pounds per square inch and 110 volts were then applied across the leads L3—L4. It was found that a current of 9 amperes flowed through the mix when the voltage was first applied but this gradually dropped to 3 amperes at the end of 5 minutes. The thickness of the wheel was 1¼ inches.

The wheel thus formed was then removed from the mold and cured in an oven according to the schedule of Example I. The resulting product was an excellent thread grinding wheel.

As would be expected, the amount of current that flows through the mix varies with the cross-sectional area and thickness of the mix. Mixes of the same composition of Example II except that 4 parts of the acetylene black were used instead of 3 were placed in apparatus of the type illustrated in Figure 1 and yielded a pressure thickness of .54 inch. The following table illustrates the effect of changes in cross sectional area of the mix on the voltage required and the current which resulted upon the application of the specified voltages.

| Mold Diameter | Arbor Diameter | Voltage | Current Range | Time in Minutes |
|---|---|---|---|---|
| 2.08 | ¾ | 80 | 7.5-7 | 4 |
| 3.07 | ½ | 75 | 11-8 | 3 |
| 4.24 | ½ | 75 | 17.5-12 | 4 |

As a general rule, the coarser grit articles require less of the conductive carbon to make a mix which has the desired characteristic of a resistivity which either remains constant or increases with increase in temperature than to the finer grits. For example, in one typical mix similar to that described in Example I it was found that when the carbon content was increased to 2 parts to 100 parts of mix, the resistance remained constant whereas an increase to 3% resulted in a mix in which the resistance decreased as the article became heated. In that mix the resistance was so high, when the carbon content was only 1.25 parts per 100 parts of mix, that practically no current flowed when 120 volts were applied across the leads L1 and L2. As is indicated under Example I, when this carbon was increased to 1.5 parts, 120 volts caused a current of 5½ amperes to flow which gradually decreased to 2½ amperes after 8 minutes.

The finer grit mixes are not so sensitive to changes in the carbon content but require a higher percentage to make a conductive mix. In one instance it was found that a mix similar to that of Example II, when molded in the apparatus of Figure 1 with a mold 2 inches in diameter and an arbor ¼ inch, was substantially non-conductive on the application of 110 volts when the carbon content was 3% but upon increasing the carbon to 3¼% and the mold diameter 3 inches, a current of 7 amperes flowed when 75 volts were applied. In this particular mix and under these conditions the voltage was gradually increased to 120 volts and even at this voltage the resistance became high after a total lapse of time of 9 minutes. Increasing the carbon content to 6% made a mix in which the resistance was substantially constant throughout the temperature range at which the mix was heated.

From the foregoing data it will be apparent that the exact amount of conductive carbon which should be added is dependent upon a number of factors, as it has been indicated above. We have illustrated our invention with various mix compositions, mold sizes and types of mold and have set forth principles to be applied in determining the proper proportion of conductive carbon. While we have described the invention with particular reference to wet abrasive mixes, we may vary the composition and character of the mixes in accordance with practices well known in the abrasive art to make articles of different grit sizes and gradings. The invention is therefore not to be restricted to the specific compositions and procedures herein set forth but, rather, is to be considered as being of the scope defined in the appended claims.

We claim:

1. A dense resin bonded abrasive article comprising abrasive grains and a resin bond comprising finely divided electrically conductive carbon, the proportion of carbon in the article being such that the electrical resistance of the mixture from which the article is formed increases as the temperature of the article is raised.

2. A dense resin bonded abrasive article comprising abrasive grains and a resin bond comprising acetylene black, the proportion of acetylene black in the article being such that the electrical resistance of the mixture from which the article is formed increases as the temperature of the article is raised.

3. A dense resin bonded abrasive article comprising abrasive grains and a resin bond comprising finely divided electrically conductive carbon, the proportion of carbon in the article being such that the electrical resistance of the mixture from which the article is formed remains substantially constant as the temperature of the article is raised.

4. A dense resin bonded abrasive article comprising abrasive grains and a resin bond comprising acetylene black, the proportion of acetylene black in the article being such that the electrical resistance of the mixture from which the article is formed remains substantially constant as the temperature of the article is raised.

RALPH H. RUSHMER.
GEORGE J. GOEPFERT.

REFERENCES CITED

The following references are of record in the file of this patent:

UNITED STATES PATENTS

| Number | Name | Date |
|---|---|---|
| 942,808 | Bakeland | Dec. 7, 1909 |
| 2,204,617 | Peel et al. | June 18, 1940 |